Patented Aug. 19, 1924.

1,505,880

UNITED STATES PATENT OFFICE.

ANDREW MILLER FAIRLIE, OF ATLANTA, GEORGIA, ASSIGNOR TO TENNESSEE COPPER & CHEMICAL CORPORATION, OF NEW YORK, N. Y., A CORPORATION OF NEW YORK.

PAVEMENT COMPOSITION.

No Drawing.　　Application filed April 19, 1923.　Serial No. 633,278.

*To all whom it may concern:*

Be it known that I, ANDREW M. FAIRLIE, a citizen of United States, residing at Atlanta, in the county of Fulton and State of Georgia, have invented new and useful Improvements in Pavement Compositions, of which the following is a specification.

The present invention relates to a composition for use in making pavements, roadways, and the like, and the combining material employed is asphalt cement or bitumen of the grade commonly used for making roads and the like. With this material is used copper blast furnace slag, this being in a finely divided state. It is preferable that the copper blast furnace slag should be ground or otherwise comminuted so that all will pass through a fifty-mesh screen, and about 85% will pass through a two-hundred-mesh screen (i. e. of a fineness resembling that of flour). The proportions preferred are the following:

Asphalt cement or bitumen, 5 to 15% by weight,

Ground or pulverized copper blast furnace slag, 5 to 15% by weight,

Mineral aggregate, 70 to 90% by weight.

The mineral aggregate used may be any of those commonly used in making roads, crushed stone, gravel, slag (which may include copper blast furnace slag or any other slag) sand, or other equivalent material or mixtures of such materials. The slag used in the mineral aggregate does not have to be crushed to the degree of fineness above referred to, but can be in the form of lumps or pieces of such sizes as are available.

Copper blast furnace slag or copper converter slag consists largely of double silicates of calcium and iron, this material always carrying a small amount of copper, probably in the form of copper matte. The amount of copper varies a good deal running from .15% to .35% in slags of well regulated blast furnaces, but in some cases the copper content of the slag will run very much higher, even up to about 1%. This amount of copper in the slag is perhaps in the form of very fine particles of matte which have not settled out and will not readily settle out from the molten slag, due to the fineness of the particles and to the small difference in specific gravity between the matte and the slag.

Blast furnace slag has been heretofore proposed in many patents as a mineral aggregate for use in making asphalt roads. This term, as used in the prior art, I understand to mean, in most cases, slag from blast furnaces, which consists largely of calcium silicates, calcium aluminates, iron silicates, and the like, without any copper being contained therein. When slag or other material is used, as the coarse mineral aggregate in a road making composition, there is no opportunity for any extensive chemical reaction between the constituents of the slag and the asphalt, for the reason that in these compositions the mineral is generally in the form of relatively large pieces, there being of course no possibility for the bulk of the constituents of the slag to come into contact with and react with the asphalt under these conditions. When copper blast furnace slag or copper converter slag is used in the form of a very fine powder as referred to above, said slag, which contains copper compounds is found to react to some extent with the asphalt binder, producing a substantial hardening and toughening of the asphalt.

Among the mineral aggregates above referred to, is included slag, which if desired may consist of copper blast furnace slag in the form of coarse lumps of any suitable size, such as are commonly used as the mineral aggregate. This slag however does not appear to produce any substantial effect upon the asphalt, on account of the coarseness of the particles.

Asphalt used may be of the kind or kinds commonly used for road making, the specific character of the asphalt, such as melting point, as well as penetration, should be as required to suit the climatic and other conditions, where the road making composition is to be used.

The asphalt, finely ground slag and sand are preferably mixed together in a heated condition. It will be understood that in place of sand, other inert material of approximately the coarseness of ordinary sand can be used. For ordinary purposes it is recommended that the sand and asphalt be heated separately, the sand being heated to 375 degrees F. The finely ground copper blast furnace slag should be added to and well mixed with the hot sand, after which the heated asphalt cement or bitumen (at 325 degrees F.) should be added and the whole well mixed together by agitation until a homogeneous mixture is produced. The proportion of the sand to the finely divided copper blast furnace slag can vary a good deal.

The mixture of sand, cement, and powdered copper blast furnace slag (or copper converter slag) is then mixed in any suitable manner with the cement and coarse aggregate, and can be spread out on the road foundation in the usual manner and can then be densified and compacted by means of a suitable heavy roller.

The above example gives one preferred mode of combining the materials, but it is not intended to limit the use of the composition to this method. Any method can be used in which the asphalt or bitumen is well mixed with the finely comminuted copper-containing slag.

The composition has been described above, as suitable for the construction of roads, but it will be understood that it can be used for various other purposes, e. g., for making floors, blocks, roofs, or as a plastic composition for sundry other molded objects.

I claim:

1. A composition for pavements comprising as its essential constituents copper blast furnace slag and a bituminous material, a substantial part of said slag being of a flour-like fineness.

2. A composition for pavements comprising as its essential constituents copper blast furnace slag in the form of a very fine powder, and an asphalt which is substantially solid at ordinary atmospheric temperature.

3. A pavement composition containing, mineral aggregate, 70 to 90% pulverized slag containing copper matte 5 to 15%, asphaltic cement, 5 to 15%.

4. A plastic composition comprising an asphaltic cement thoroughly incorporated with a finely pulverized slag containing a small percentage of copper, such latter acting to harden and toughen the product.

In testimony whereof I affix my signature.

ANDREW MILLER FAIRLIE.